(12) United States Patent
Ye

(10) Patent No.: US 11,040,791 B2
(45) Date of Patent: Jun. 22, 2021

(54) VACUUM SEALER

(71) Applicant: Guangdong Willing Technology Corporation, Guangdong (CN)

(72) Inventor: Jingnong Ye, Huizhou (CN)

(73) Assignee: GUANGDONG WILLING TECHNOLOGY CORPORATION, Guangdong (CN)

( * ) Notice: Subject to any disclaimer, the term of this patent is extended or adjusted under 35 U.S.C. 154(b) by 204 days.

(21) Appl. No.: 16/358,703

(22) Filed: Mar. 20, 2019

(65) Prior Publication Data

US 2020/0299013 A1    Sep. 24, 2020

(51) Int. Cl.
| | |
|---|---|
| *B65B 31/04* | (2006.01) |
| *B65B 51/10* | (2006.01) |
| *B65B 61/06* | (2006.01) |
| *B29C 65/00* | (2006.01) |
| *B65B 51/14* | (2006.01) |
| *B29C 65/22* | (2006.01) |

(52) U.S. Cl.
 CPC .......... *B65B 31/048* (2013.01); *B29C 65/222* (2013.01); *B29C 65/223* (2013.01); *B29C 66/00145* (2013.01); *B29C 66/43121* (2013.01); *B29C 66/8742* (2013.01); *B65B 51/10* (2013.01); *B65B 51/146* (2013.01); *B65B 61/06* (2013.01)

(58) Field of Classification Search
 CPC ..... B65B 31/024; B65B 31/04; B65B 31/046; B65B 31/048; B65B 31/06; B65B 51/146; B65B 51/148; B65B 57/005; B65B 61/06; B29C 66/00145; B29C 66/874; B29C 66/8742

See application file for complete search history.

(56) References Cited

U.S. PATENT DOCUMENTS

| | | | | |
|---|---|---|---|---|
| 2,749,686 A | * | 6/1956 | Lorenz et al. | .......... B65B 31/06 53/434 |
| 7,759,611 B2 | * | 7/2010 | Cheney et al. | ....... B29C 66/818 219/243 |
| 2005/0108990 A1 | * | 5/2005 | Kahn et al. | ............ B65B 51/146 53/432 |
| 2010/0116441 A1 | * | 5/2010 | Tsai et al. | .......... B29C 66/81457 156/583.9 |

(Continued)

FOREIGN PATENT DOCUMENTS

DE    202018106481 U1 *  11/2018    ........... B65B 57/005

*Primary Examiner* — Stephen F. Gerrity
(74) *Attorney, Agent, or Firm* — Leong C. Lei

(57) ABSTRACT

The vacuum sealer includes a base, a cover, a vacuuming device, at least a heating device, at least a heat-resistant element wrapping around the heating device, at least a heat insulation element between the base and the heating device, at least a power provision device, and at least a safety breaker device. The safety breaker device includes at least a safety switch, and at least a trigger element. The object to be sealed is placed on the heating device and, as the cover closes the base, the safety switch engages the trigger element to release the safety breaker device and to allow the power provision device to power the heating device. The heat insulation element prevents heat from being conducted to the base. With the dual protection from the safety breaker device and the heat insulation element, safety is enhanced and the power provision device may operate under high voltage.

6 Claims, 18 Drawing Sheets

(56) References Cited

U.S. PATENT DOCUMENTS

| | | | |
|---|---|---|---|
| 2012/0060447 A1* | 3/2012 | Liu et al. | B29C 65/224 53/434 |
| 2012/0090281 A1* | 4/2012 | Abate et al. | B65B 31/046 53/510 |
| 2013/0020314 A1* | 1/2013 | Hashimoto et al. | B29C 65/223 219/553 |
| 2018/0162569 A1* | 6/2018 | Day et al. | B65B 25/001 |
| 2019/0283916 A1* | 9/2019 | Menta et al. | B65B 67/02 |

* cited by examiner

VACUUM SEALER

BACKGROUND OF THE INVENTION

(a) Technical Field of the Invention

The present invention is generally related to vacuum sealers, and more particular to a vacuum sealer with enhanced safety features.

(b) Description of the Prior Art

To store fresh food for an extended period, the most effective way is to separate the food from air. Therefore, there are various plastic bags providing airtight sealing to preserve the freshness of the food. Heat sealing that applies heat to weld the plastic bag opening together is also a common practice.

Portable heat sealers are therefore gaining popularity. These heat sealers are usually powered by a number of 12V or 24V batteries to drive copper wires of high thermal conductivity, and achieve heat sealing through the heat produced by the copper wires. There are also desktop heat sealers that are powered by the 110V mains.

These conventional heat sealers have a number of shortcomings as follows.
1. Portable heat sealers require longer heating time and are more power consuming
2. Desktop heat sealers usually do not have sufficient safety measure and users are often burned by the heating wire or the casing.
3. These small to medium sized heat sealers provide only sealing function. To achieve airtight packaging, however, vacuuming the plastic bag and cutting excessive plastic are also required. Therefore, the conventional heat sealers are not satisfactory in terms of convenience.

SUMMARY OF THE INVENTION

A major objective of the present invention is to achieve greater usage safety and the use of higher voltage through heat insulation/resistance and automatic power cut-off.

To achieve the objective, the vacuum sealer includes a base; a cover pivotally joined to the base; a vacuuming device on the base and the cover; at least a heating device inside the base to a side of the vacuuming device; at least a heat-resistant element wrapping around the heating device; at least a heat insulation element between the base and the heating device; at least a power provision device to a side of the base electrically connected to the heating device; and at least a safety breaker device disrupting electricity provision of the power provision device, where the safety breaker device includes at least a safety switch inside the base, and at least a trigger element on the cover; wherein electricity provision from the power provision device is conducted only when the trigger element and the safety switch are engaged.

To operate the vacuum sealer, the object to be sealed is placed on the heating device and, as the cover closes the base, the safety switch engages the trigger element to release safety breaker device and to allow the power provision device to power the heating device. The vacuuming device then extracts air from within the object so that the object is vacuumed. The heating device then performs heat sealing. The heat insulation element prevents heat from conducted to the base. With the dual protection from the safety breaker device and the heat insulation element, safety is enhanced and the power provision device may operate under high voltage.

Through the present invention, the shortcomings of the conventional hot sealers, such as low power, long heating time, no safety measure against burn hazard, having only sealing function, etc., are resolved.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
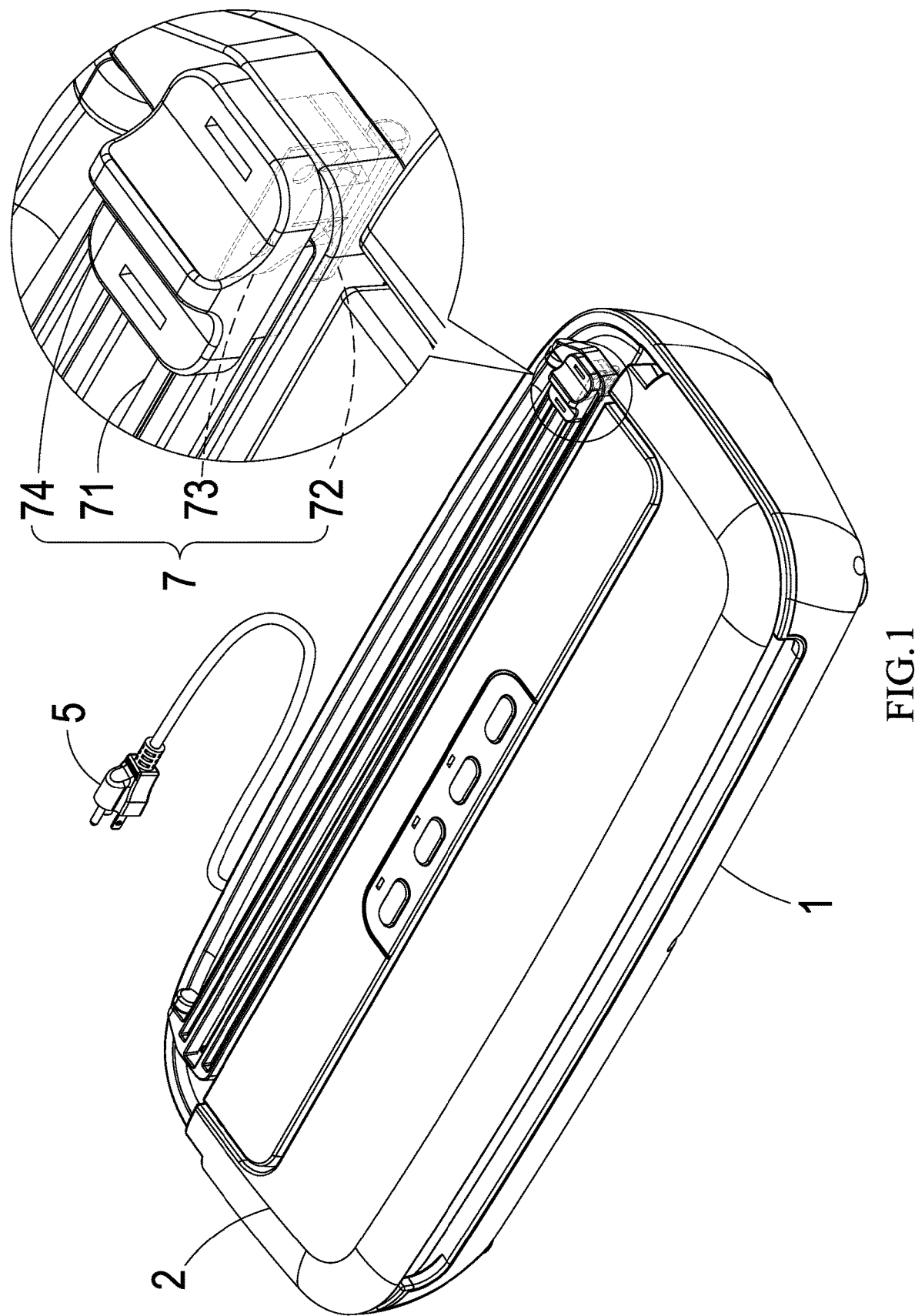
FIG. 1 is a perspective diagram showing a vacuum sealer according to a first embodiment of the present invention.
Figure 2:
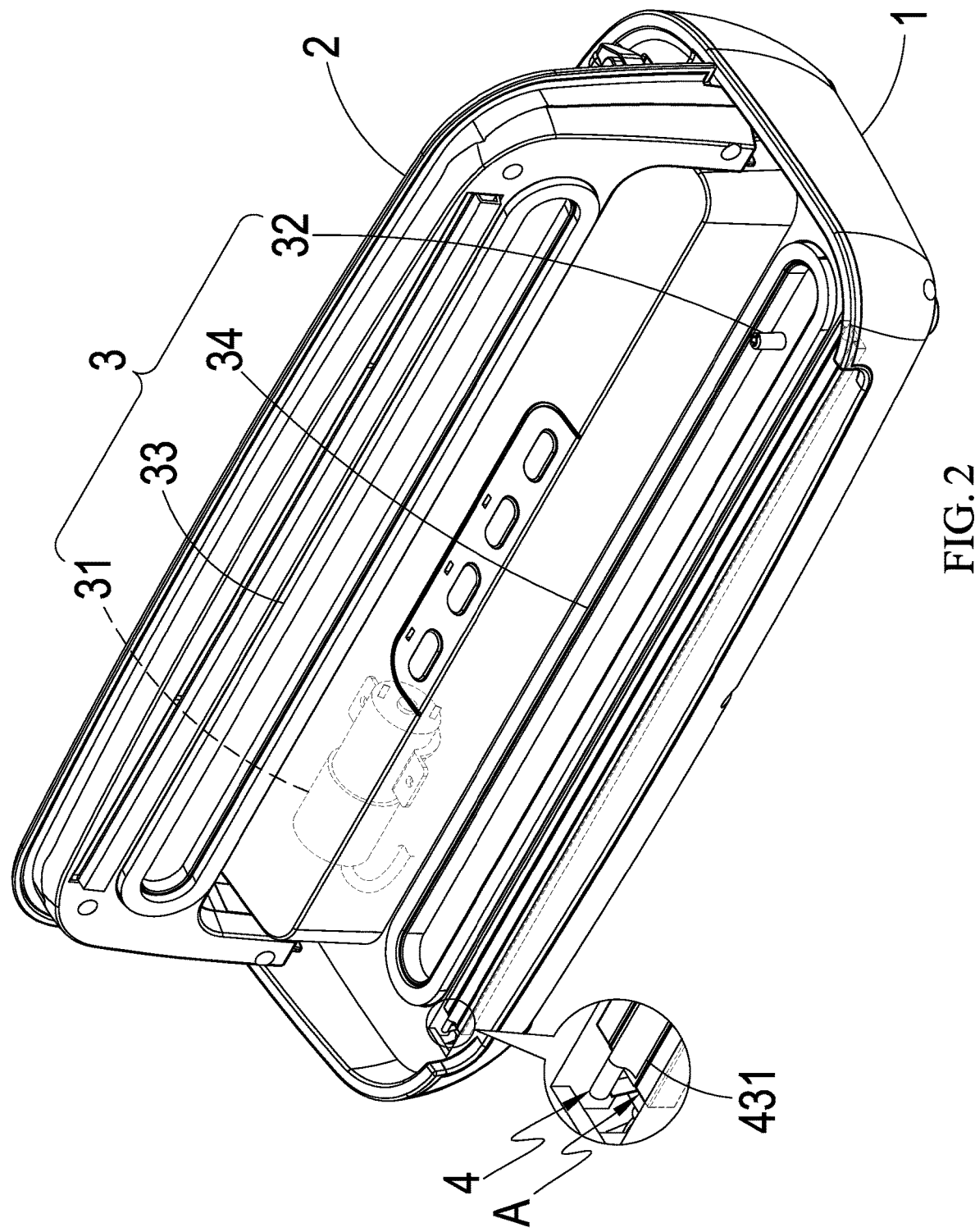
FIG. 2 is another perspective diagram showing the vacuum sealer of FIG. 1 with its cover opened.
Figure 3:
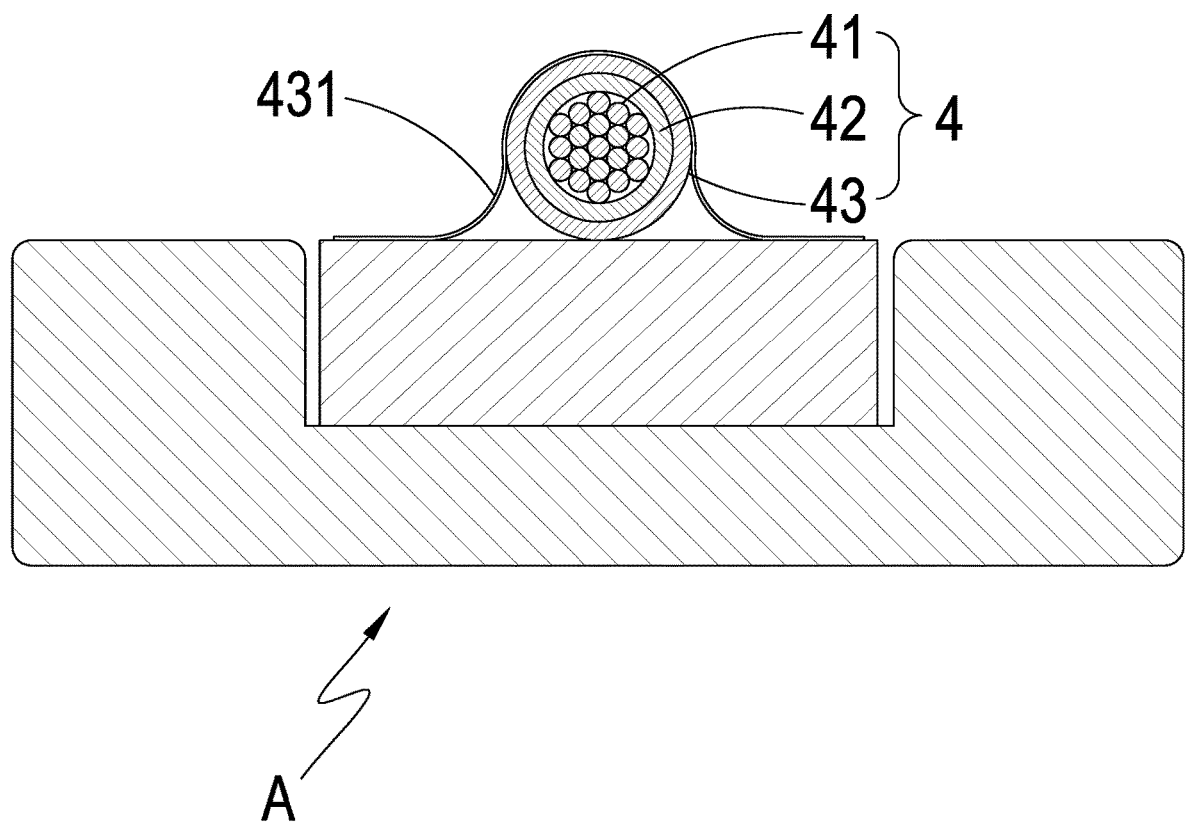
FIG. 3 is a schematic diagram showing a heating device of the vacuum sealer of FIG. 1.
Figure 4:
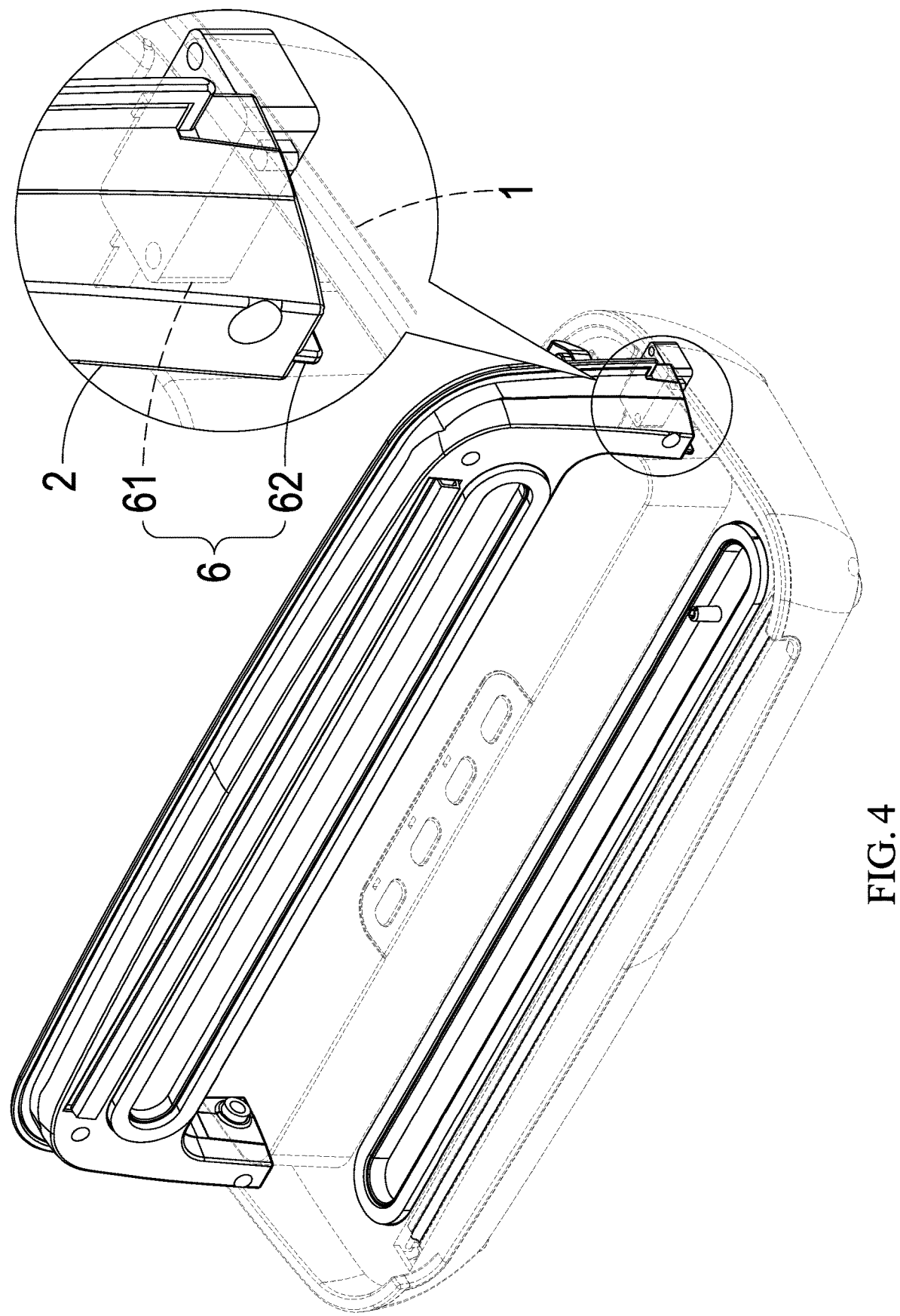
FIG. 4 is a perspective diagram showing a safety breaker device of the vacuum sealer of FIG. 1 with its cover opened.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

As shown in FIGS. 1 to 4, a vacuum sealer according to a first embodiment of the present invention includes a base 1;

a cover 2 pivotally joined to a top side of the base 1;

a vacuuming device 3 on the base 1 and the cover 2, where the vacuuming device 3 includes a vacuuming pump 31 inside the base 1, at least a suction pipe 32 inside the base 1 connected with the vacuuming pump 31, a first sealing ring 33 on the base 1 surrounding the suction pipe 32, and a second sealing ring 34 on the cover 2 corresponding to the first sealing ring 33;

at least a heating device 4 inside the base 1 to a side of the vacuuming device 3, where the heating device 4 includes multiple heat conduction elements 41 such as carbon fibers, and at least a heating wire 42 winding around the heat conduction elements 41;

at least a heat-resistant element 43 wrapping around the heating device 4, where the heat-resistant element 43 is one of a nylon sleeve, a carbon fiber sleeve, and a polytetrafluoroethylene sleeve, and the heat-resistant element 43 includes a heat-resistant plastic sheet 431 made of polytetrafluoroethylene;

at least a heat insulation element A between the base 1 and the heating device 4;

at least a power provision device 5 to a side of the base 1 electrically connected to the heating device 4 providing an electricity of 220 to 240 Volt;

at least a safety breaker device 6 disrupting the electricity provision of the power provision device 5, where the safety breaker device 6 includes at least a safety switch 61 inside the base 1, and at least a trigger element 62 on the cover 2, and electricity provision from the power provision device 5 is conducted only when the trigger element 62 and the safety switch 61 are engaged;

a cutter device 7 pivotally joined to the top side of the base 1, where the cutter device 7 includes a sliding duct 71 on the base 1, at least a cutting pad 72 inside the sliding duct 71, at least a cutter 73 slidably disposed in the sliding duct 71 through the cutting pad 72, and a handle 74 on the cutter 73.

As shown in FIGS. 1 to 11, the present embodiment is a portable vacuum sealer with a flip-top cover 2 design. During the heating process, the cover 2 has to be closed. Together with the heating device 4's complete concealment in the base 1, the heat insulation design, and the automatic power cut-off when cover 2 is opened, the safety of the vacuum sealer is greatly enhanced.

Figure 5:
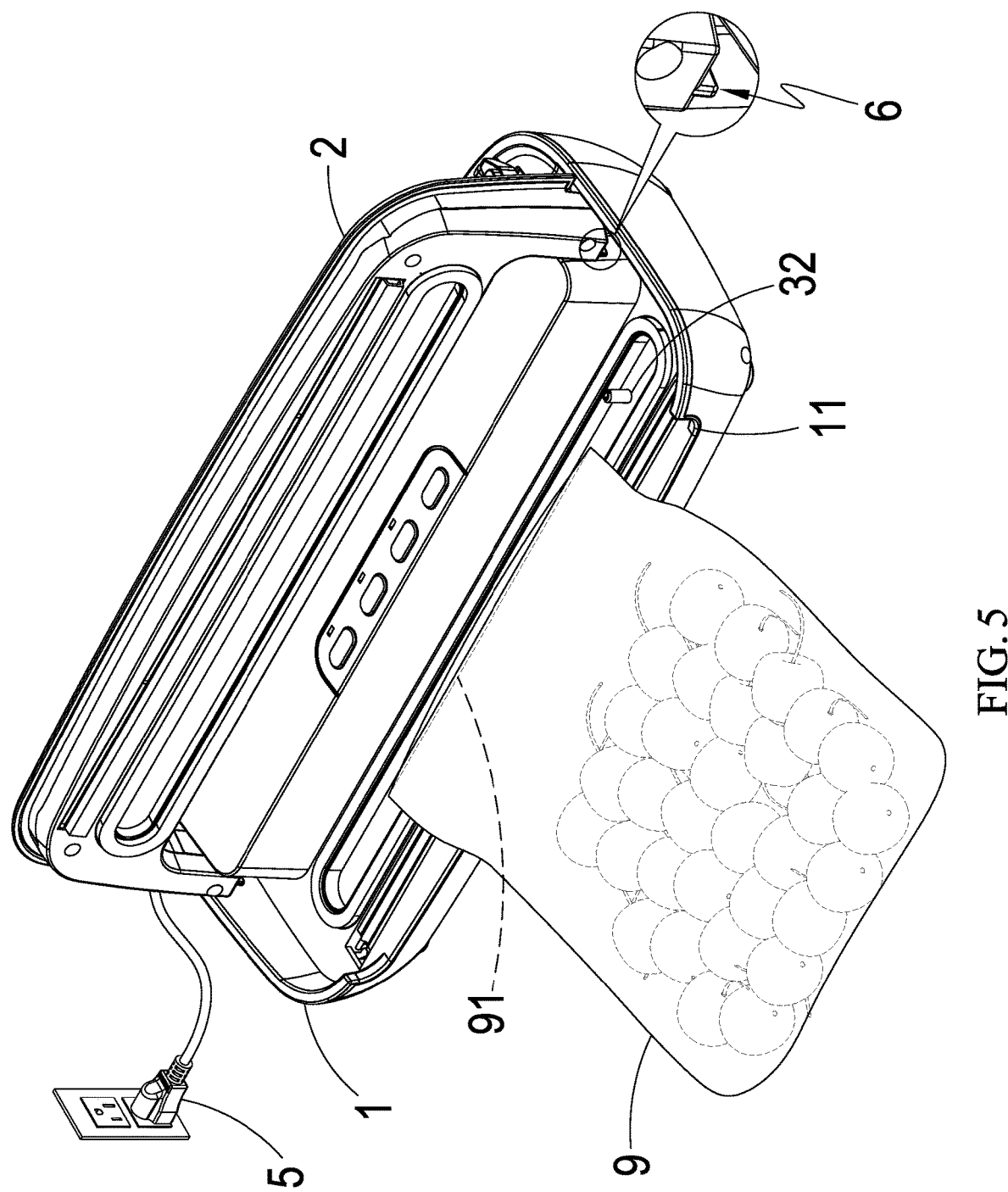
FIG. 5 is a perspective diagram showing an object being vacuumed by the vacuum sealer of FIG. 1.
Figure 6:
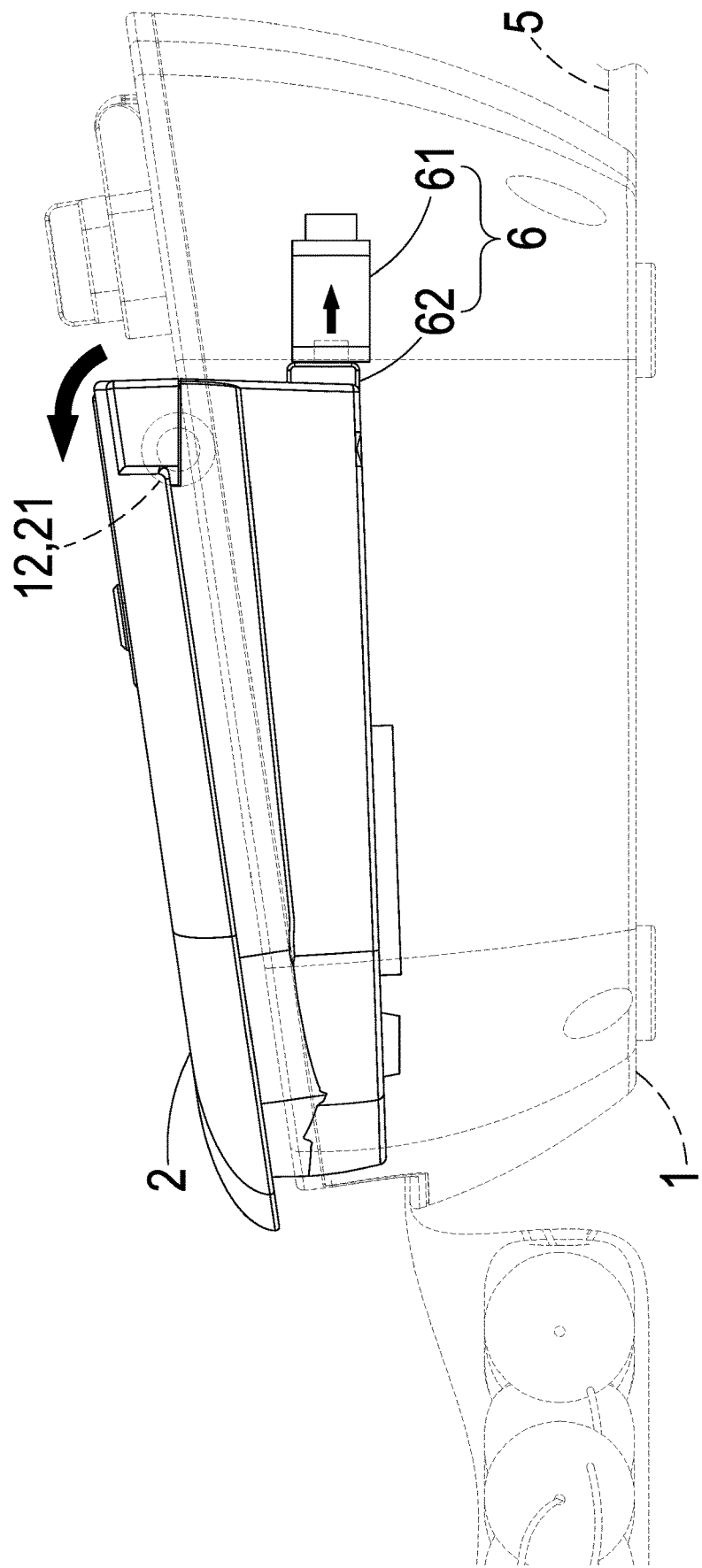
FIG. 6 is a schematic diagram showing electricity provision to the vacuum sealer of FIG. 1.

To operate the vacuum sealer, the power provision device 5 is first engaged to provide electricity, which is exemplified in the present embodiment as connecting a power cable to a wall socket. The cover 2 is opened and, due to the safety breaker device 6's automatic power cut-off, electricity provision from the power provision device 5 is disrupted. Then, an object 9 to be sealed, such as a plastic bag, is placed along an indentation 11 of the base 1 and an opening 91 of the object 9 is located to a side of suction pipe 32, as shown in FIG. 5. The cover 2 is then closed. As the trigger element 62 of the safety breaker device 6 is configured adjacent to an axle 21 of the cover 2, the trigger element 62 would press the safety switch 61 adjacent to an axle 12 of the base 1, when the cover 2 is closed. The engagement between the trigger element 62 and the safety switch 61 turns the power provision device 5's electricity provision circuit from open-circuit to close-circuit, thereby resuming the power provision device 5's electricity provision as shown in FIG. 6.

Figure 7:
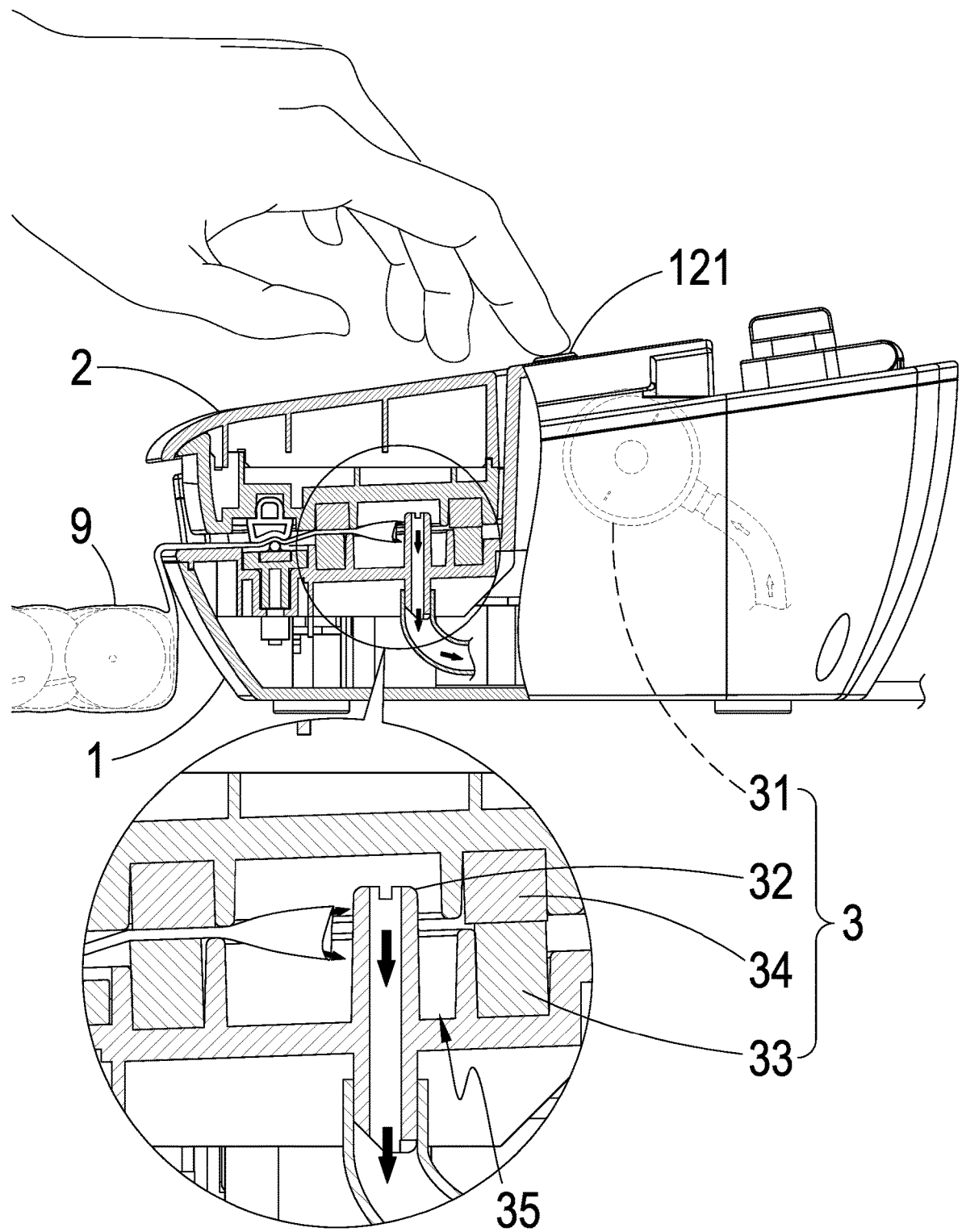
FIG. 7 is a schematic diagram showing the airflow when an object is vacuumed by the vacuum sealer of FIG. 1.

As shown in FIG. 7, after the cover 2 is closed, the first sealing ring 33 of the base 1 and the second sealing ring 34 of the cover 2 are attached together to form a suction space 35, and the suction pipe 32 is located within the suction space 35. When a suction switch 121 is turned on, the vacuuming pump 31 is activated to vacuum the suction space 35 through the suction pipe 32. The object 9 is clamped by the first sealing ring 33 and the second sealing ring 34 while the vacuuming pump 31 draws air from within the object 9 so that the object 9's inside becomes vacuum.

Figure 8:
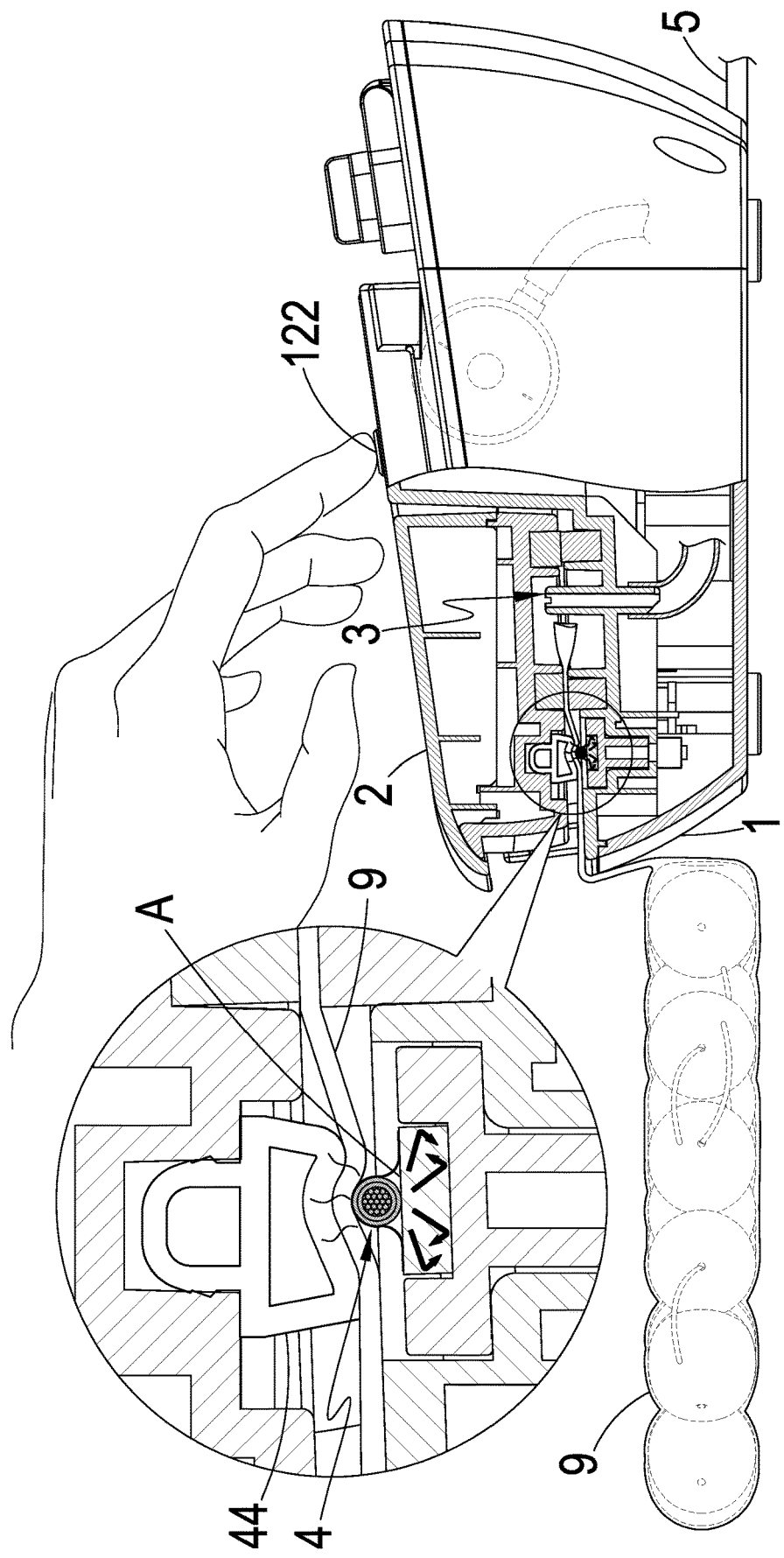
FIG. 8 is a schematic diagram showing heat sealing by the vacuum sealer of FIG. 1.

As shown in FIG. 8, after visually determining that the object 9 is vacuumed, a sealing switch 122 is engaged to start the heat sealing process without moving the object 9 so as to maintain the vacuum state of the object 9. After the sealing switch 122 is depressed, electricity from the power provision device 5 is conducted to the heating device 4. The heating device 4 contains multiple heat conduction elements 41 made of carbon fibers wound by the heating wire 42 and is fixed onto the heat insulation element A by the heat-resistant plastic sheet 431, thereby achieving fast and uniform heat production across the entire heating device 4. The object 9 is reliably pressed to the heating device 4 by a hold-down strip 44 on the cover 2. As the heating device 4 is wrapped by the heat-resistant element 43, the object 9 is flatly contacted with the heating device 4. In the meantime, the heating wire 42 is prevented from directly contacting with the object 9, thereby enhancing the sealing efficiency and quality to the object 9 by the heating device 4. Also, as there is at least a heat insulation element A between the heating device 4 and the base 1 for supporting the heating device 4, and the heat insulation element A is made of a material of high specific heat and low thermal conductivity, a reduced amount of heat is conducted to the base 1 or the cover 2. As such, in addition to housing the heating device 4 inside the cover 2 and the base 1, less heat from the heating device 4 is absorbed by the cover 2 and the base 1. The hazard of being burned by the vacuum sealer is reduced to a minimum.

Due to the heat insulation and heat resistance design of the heating device 4 and the safety breaker device 6's automatic power cut-off, the vacuum sealer may operate under high voltage from 220 to 240 Volt. By using high voltage, the heating device 4 has enhanced heating performance and quality, and may reduce heating time. Furthermore, the vacuum sealer is applicable in countries using 220 to 240 Volt voltage, increasing its usability.

Figure 9:
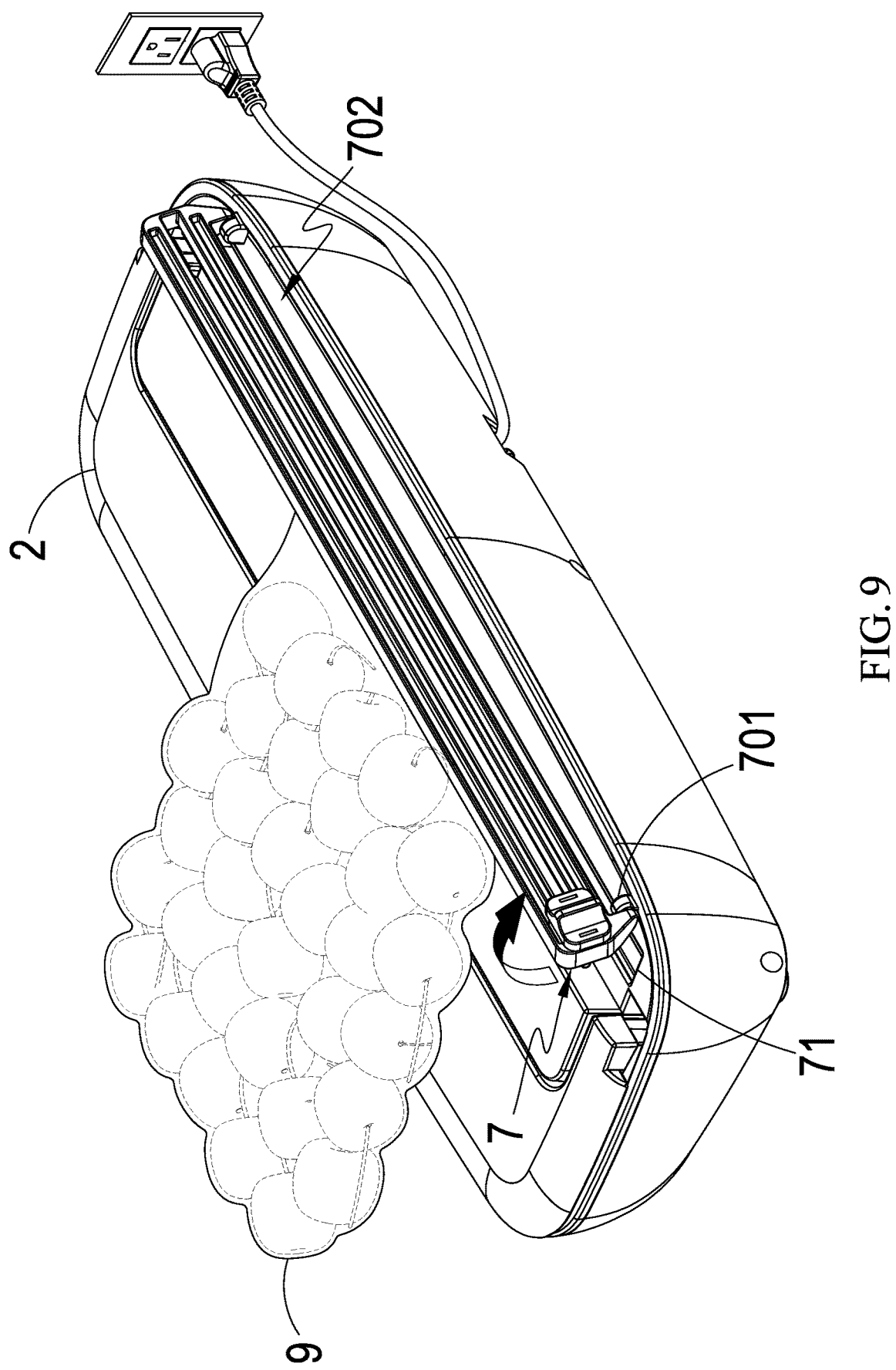
FIG. 9 is a perspective diagram showing a first step of the process to perform cutting by the vacuum sealer of FIG. 1.
Figure 10:
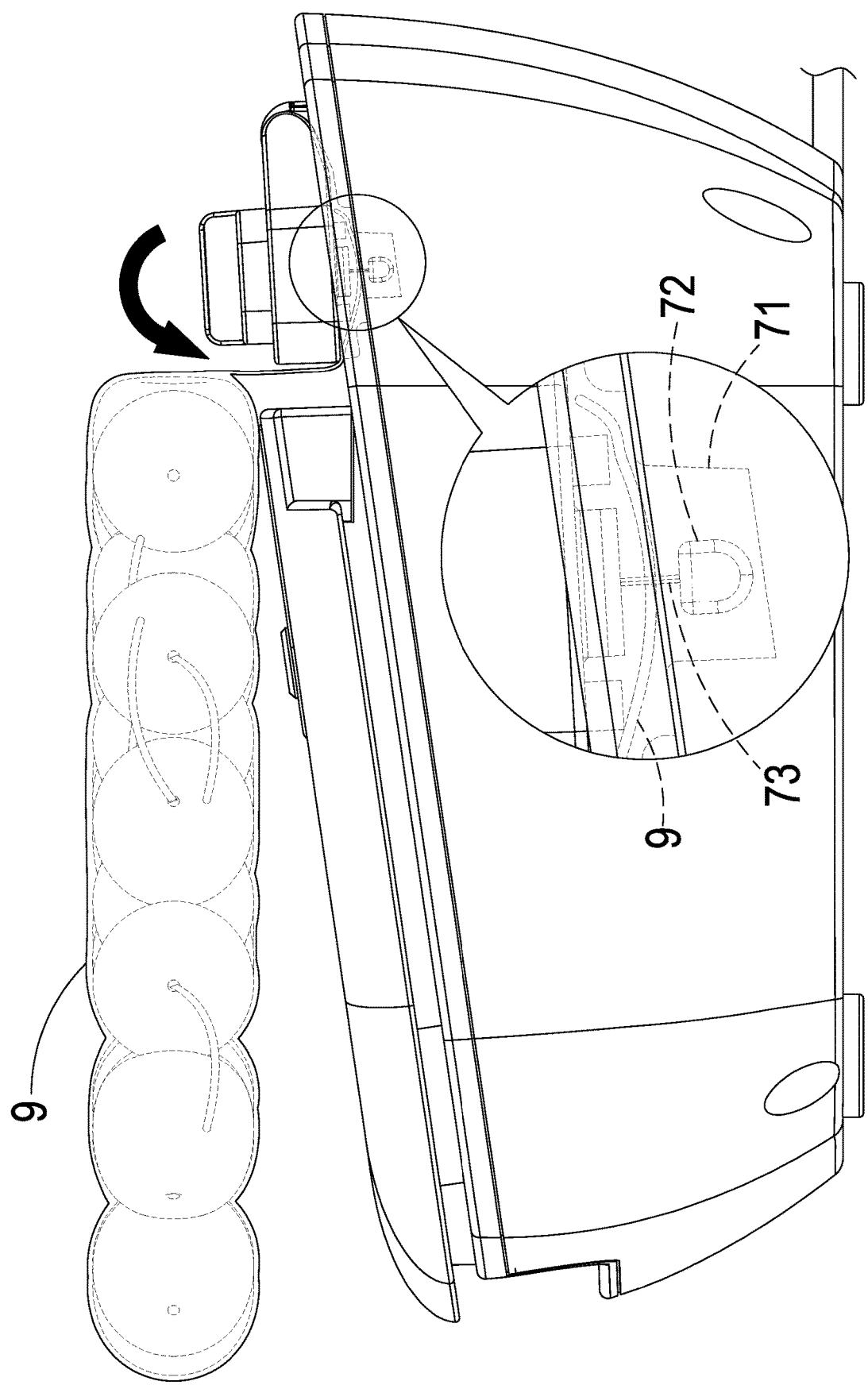
FIG. 10 is a schematic diagram showing a second step the process to perform cutting by the vacuum sealer of FIG. 1.
Figure 11:
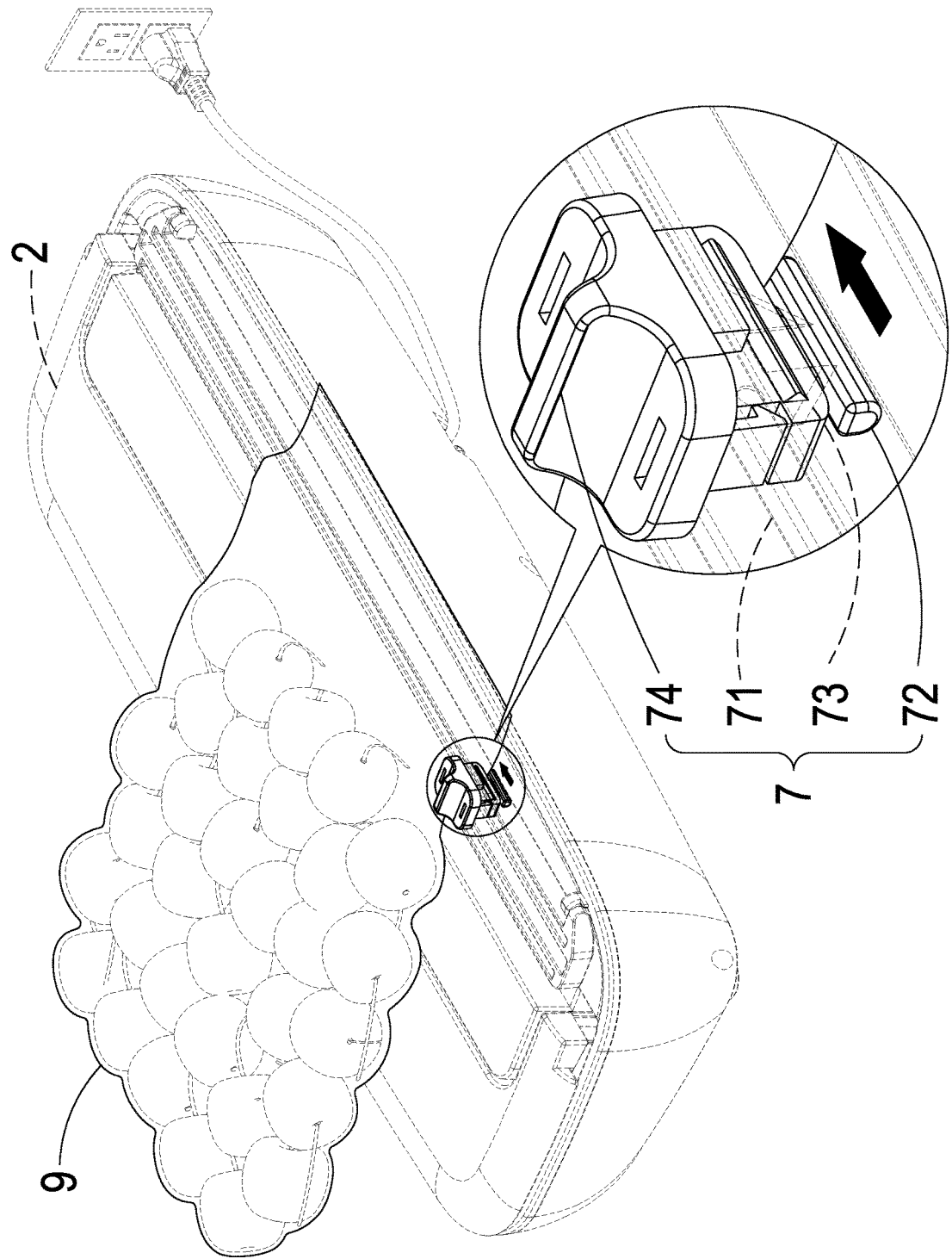
FIG. 11 is a perspective diagram showing a third step of the process to perform cutting by the vacuum sealer of FIG. 1.

The vacuum sealer also provides a cutting function. As shown in FIG. 9, after the hot sealing is completed and the object 9 is removed, the cutting device 7 is flipped around an axle 701 and the extraneous part of the object 9 is placed in the sliding duct 71. Alternatively, the extraneous part of the object 9 may be inserted into the sliding duct 71 through a slit 702 from the back of the base 1. The cutting pad 72 supports the object 9 so that the object 9 lays flatly on the cutting pad 72. As shown in FIG. 10, the cutter 73 provides a blade having a 45-degree included angle relative to the cutting pad 72 so that the cutting by the cutter 73 has enhanced quality, stability, and smoothness as the cutter 73 is moved along sliding duct 71 by the handle 74, as shown in FIG. 11.

Figure 12:
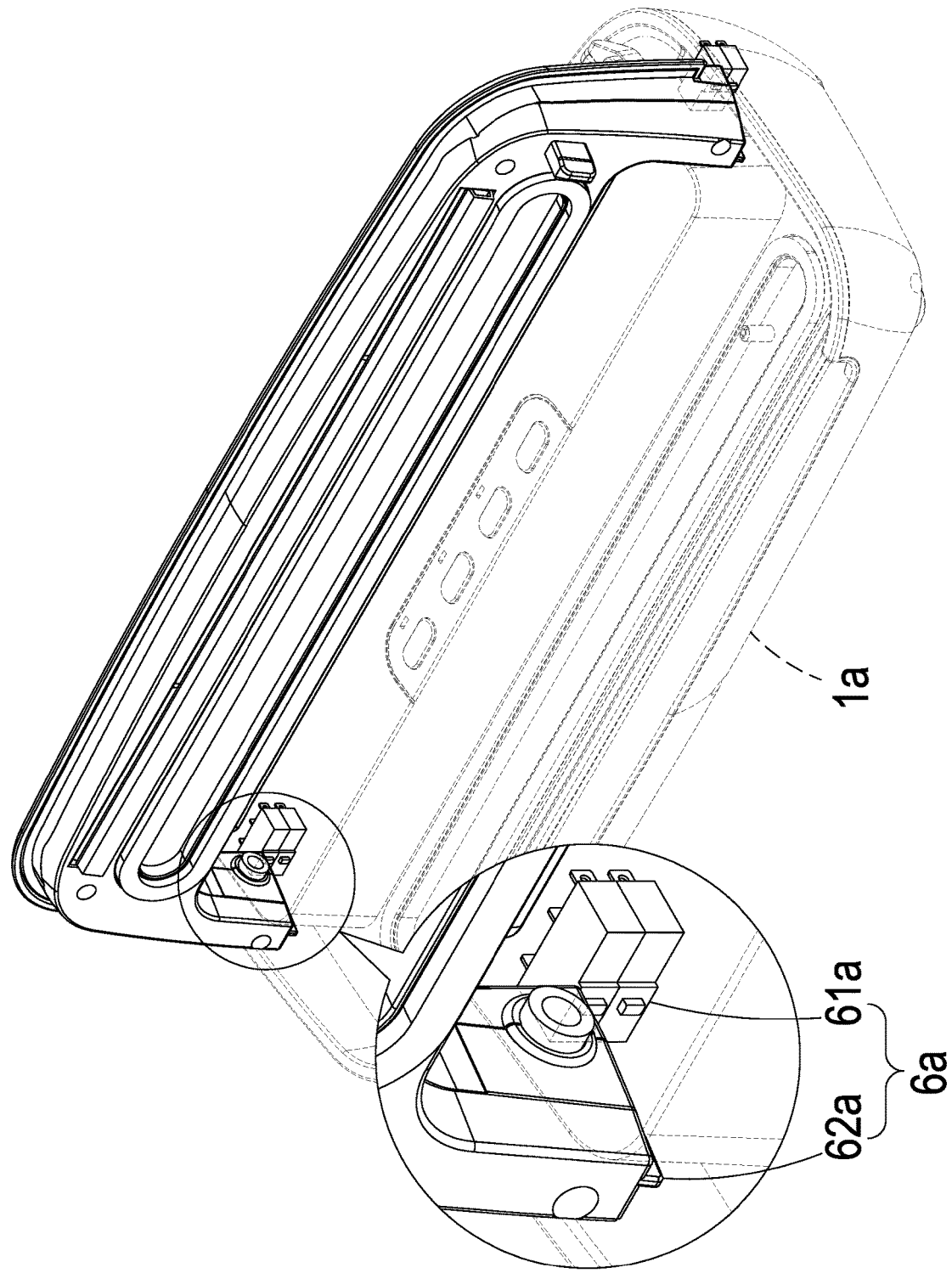
FIG. 12 is a perspective diagram showing a safety breaker device of a vacuum sealer according to a second embodiment of the present invention.
Figure 13:
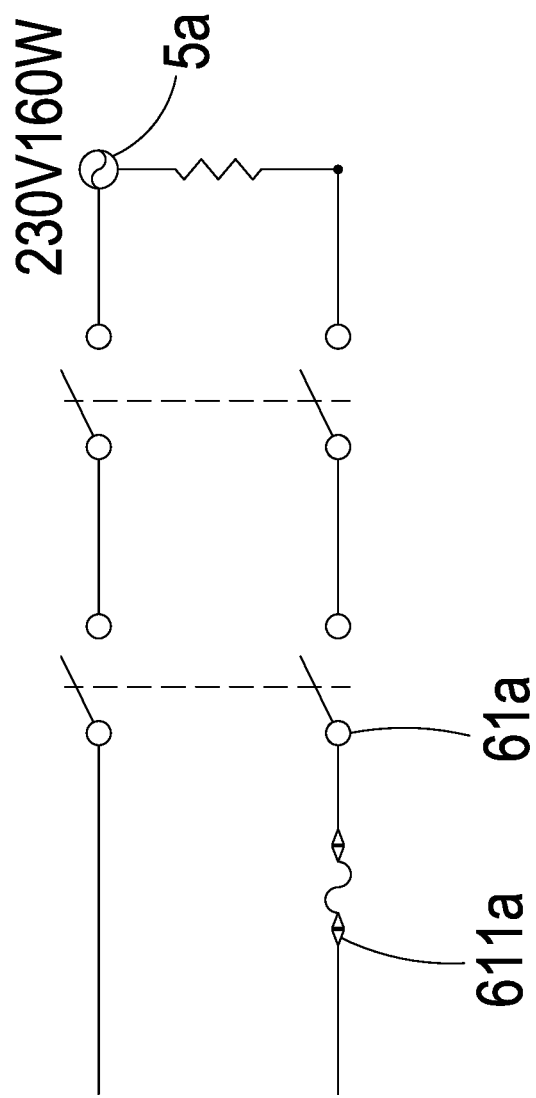
FIG. 13 is a circuit diagram showing the safety breaker device of FIG. 12.

FIGS. 12 and 13 show a second embodiment of present invention. The present embodiment is the same as the previous embodiment except that there are four safety switches 61a of the safety breaker device 6a disposed to two sides of the base 1a. Electricity provision to the power provision device 5a is disrupted as long as any one of the safety switches 61a is not engaged by a corresponding trigger element 62a. This design is to increase the sensitivity of automatic power cut-off and therefore the safety of the vacuum sealer. Additionally, each safety switch 61a is series-connected with thermal fuse 611a so that, when the circuit is overheated, the circuit is automatically opened as an additional safety measure.

Figure 14:
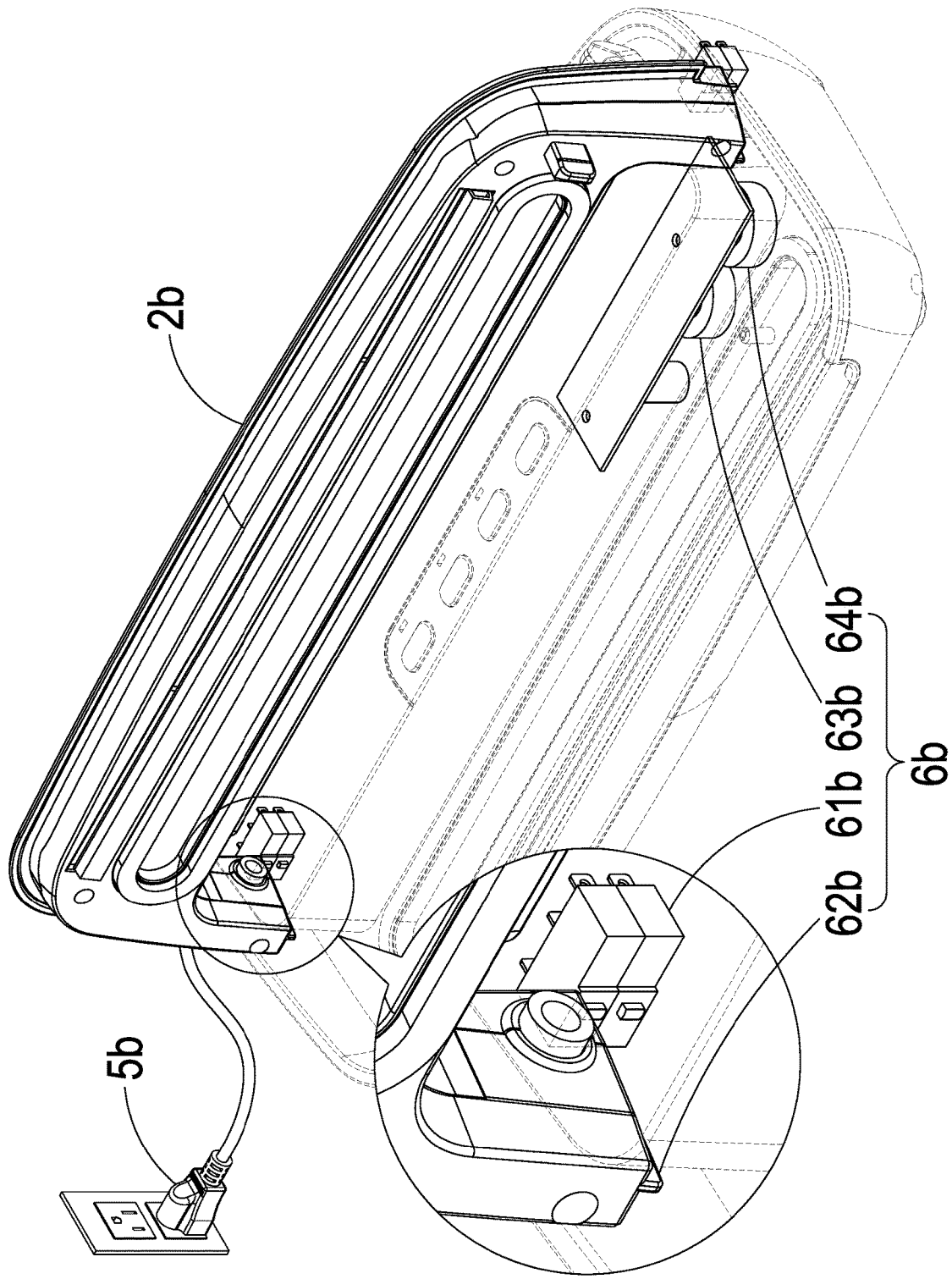
FIG. 14 is a perspective diagram showing a safety breaker device of a vacuum sealer according to a third embodiment of the present invention.
Figure 15:
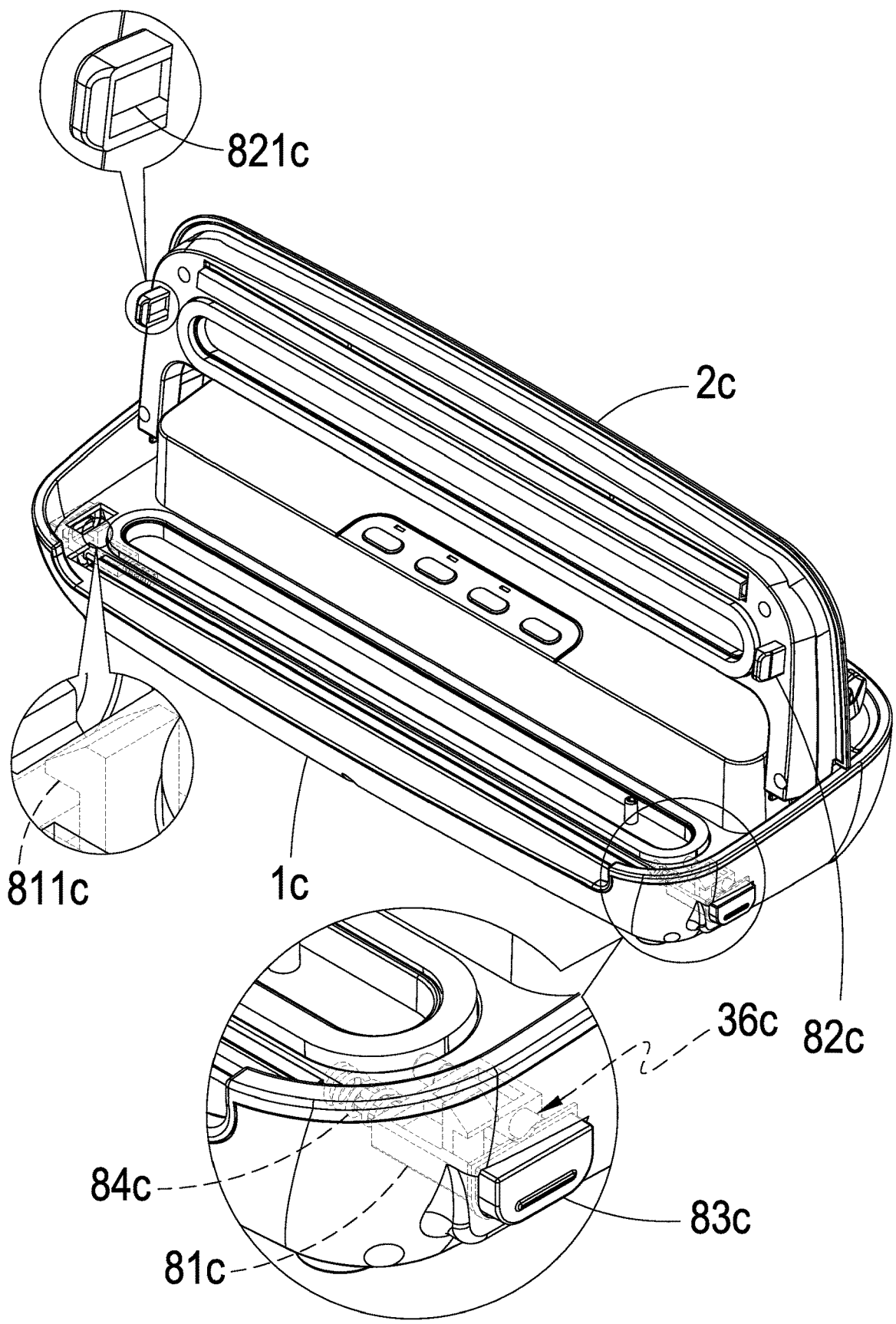
FIG. 15 is a perspective diagram showing a vacuum sealer according to a fourth embodiment of the present invention.

FIG. 14 shows a third embodiment of present invention. The present embodiment is the same as the previous embodiments except that safety breaker device 6b further includes a processing module 63b activated when the trigger element 62b and the safety switch 61b are engaged, and a relay 64b to a side of the processing module 63b electrically connected to the power provision device 5b. In the present embodiment, there is a safety switch 61b to each lateral side. When the cover 2b is closed, trigger elements 62b engage corresponding safety switches 61b and the processing module 63b is activated. The processing module 63b controls the relay 64b to conduct the electricity provision from the power provision device 5b. The gist of the embodiment lies in a different operation from the safety breaker device 6b.

Figure 16:
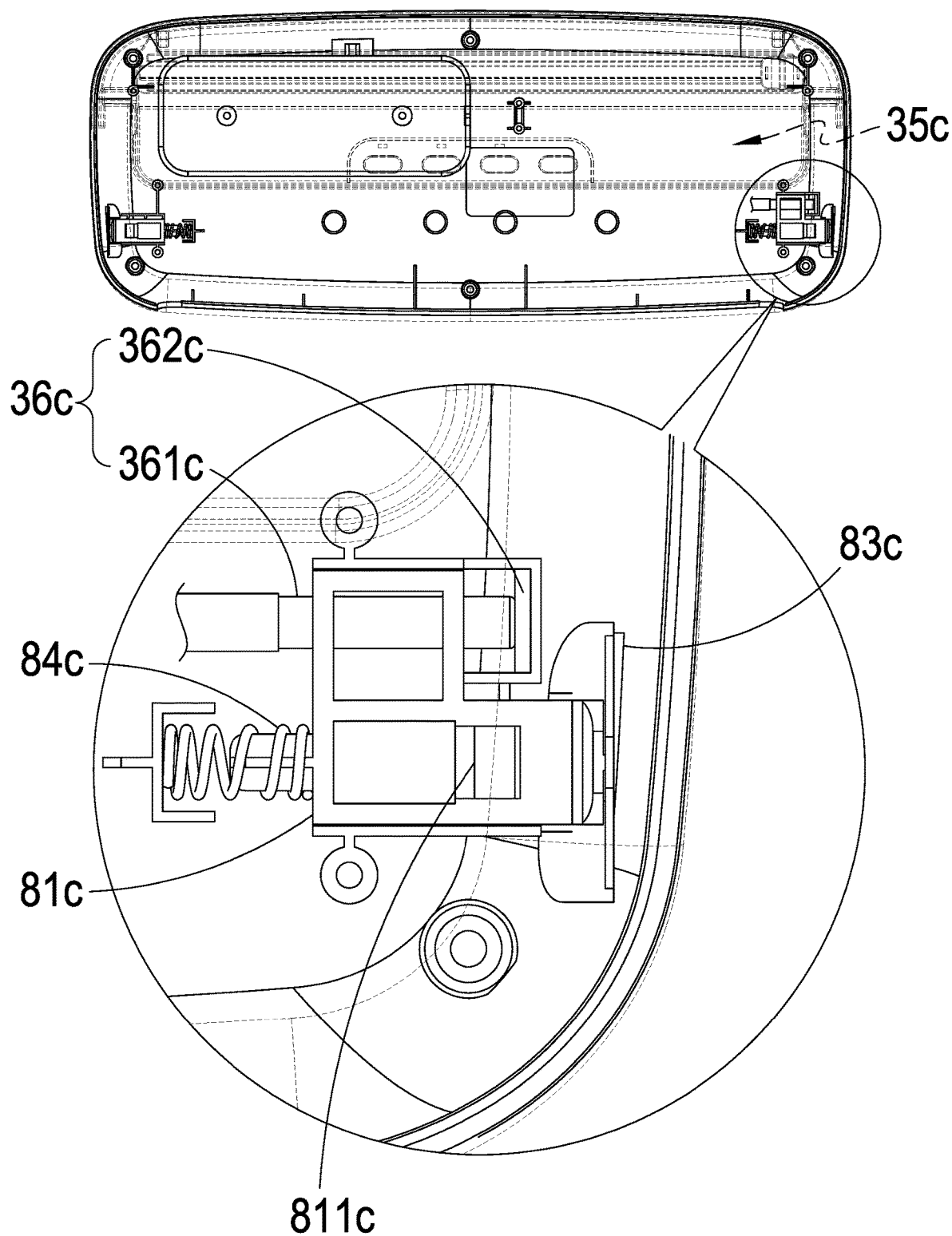
FIG. 16 is a schematic top-view diagram showing a pressure releasing scenario of the vacuum sealer of FIG. 15.
Figure 17:
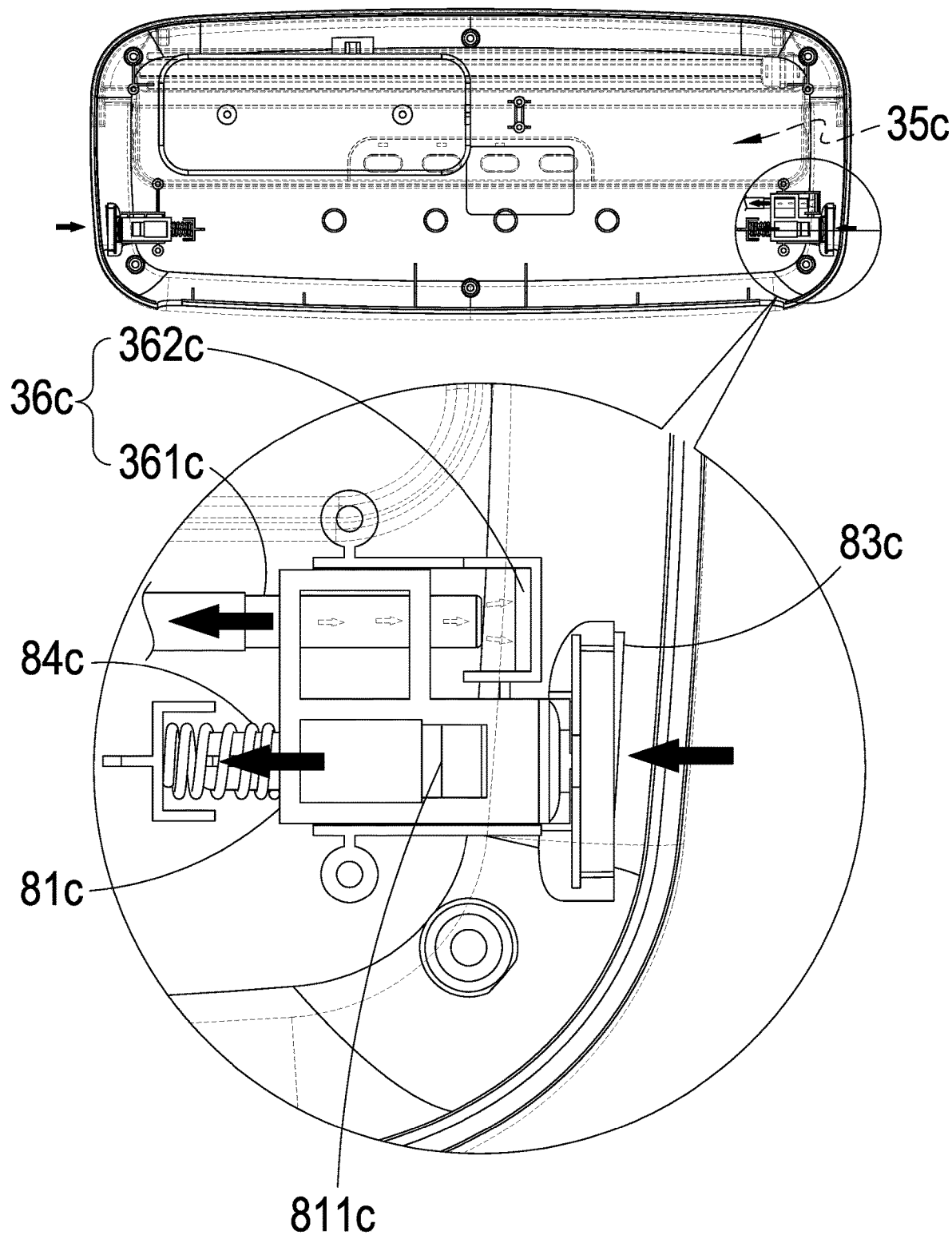
FIG. 17 is another schematic top-view diagram showing a pressure releasing scenario of the vacuum sealer of FIG. 15.
Figure 18:
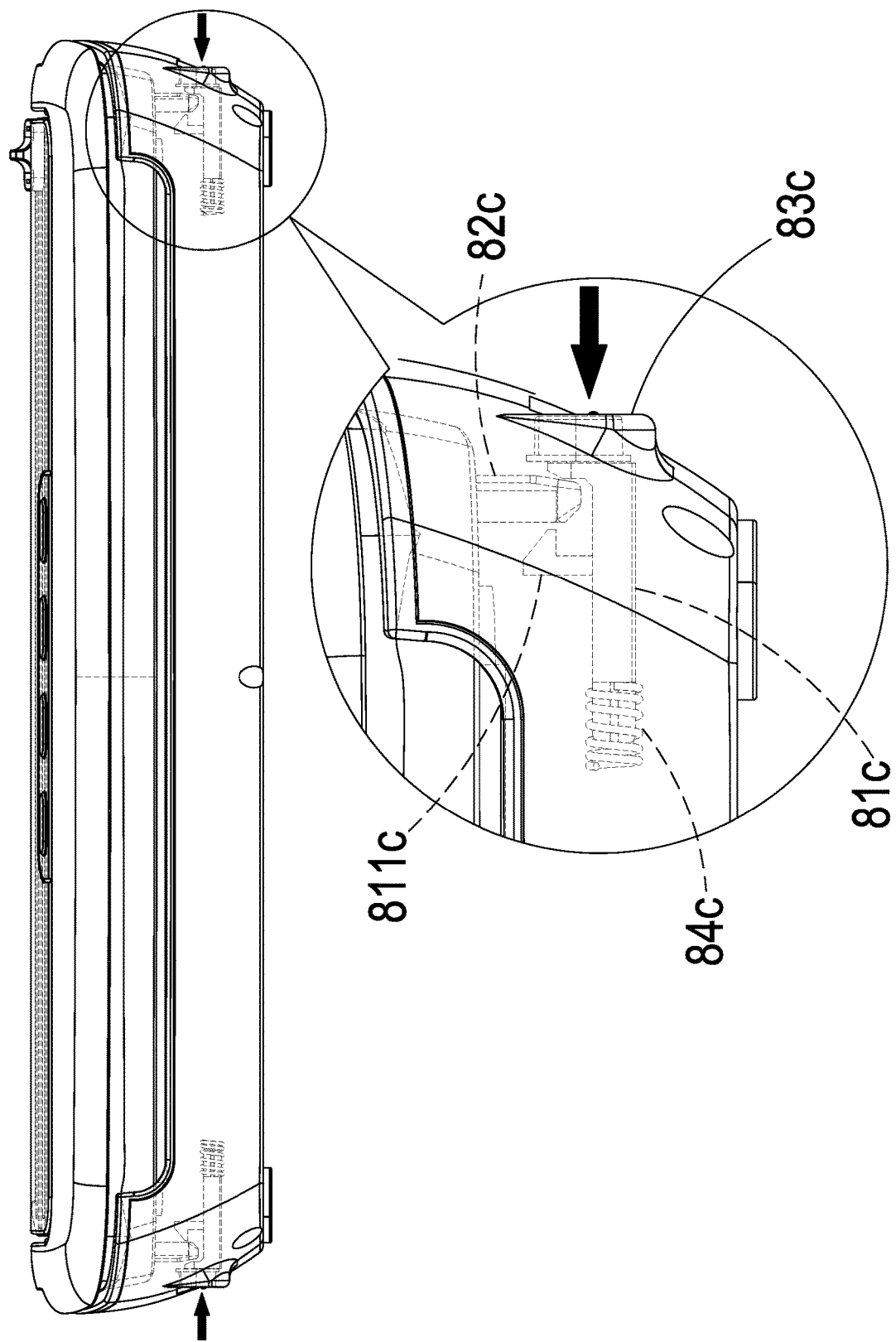
FIG. 18 is a schematic front-view diagram showing a locking scenario of the vacuum sealer of FIG. 15.

FIGS. 15 to 18 depict a fourth embodiment of the present invention, FIGS. 16 and 17 are top-view schematic diagrams and FIG. 18 is a front-view schematic diagram. The present embodiment is the same as the previous embodiments except that the vacuum sealer further includes at least a first fastening element 81c disposed to a side of the base 1c, at least a second fastening element 82c on a bottom side of the cover 2c corresponding to the first fastening element 81c, a pressure-releasing element 36c cooperatively operating with the first fastening element 81c, at least a button element 83c to a side of the base 1c connecting the first fastening element 81c for disengaging the first fastening element 81c and the second fastening element 82c, and an elastic element 84c on the first fastening element 81c away from the button element 83c. The first fastening element 81c includes a hook 811c. The second fastening element 82c extends from the cover 2c to plug into the base 1c and includes a socket 821c. The pressure-releasing element 36c in the present embodiment includes a pressure-releasing pipe 361c adjacent to the first fastening element 81c connecting the suction space 35c, and a blocking piece 362c fixed to a side of the base 1c for blocking the pressure-releasing pipe 361c. When the cover 2c is closed, the hook 811c engages the socket 821c so prevent the accidental open of the cover 2c. In the meantime, the blocking piece 362c blocks the pressure-releasing pipe 361c without interfering the suction space 35c from being vacuumed. After hot sealing, depressing the button element 83c to pull the first fastening element 81c inward so that the hook 811c release the socket 821c, thereby unlocking the cover 2c. In the meantime, the pressure-releasing pipe 361c moves synchronously inward with the first fastening element 81c, and the blocking piece 362c and pressure-releasing pipe 361c are separated, thereby releasing the negative pressure of the suction space 35c to facilitate the open of the cover 2c. The button element 83c, after being released, is restored to its original position by the elastic element 84c. In the present embodiment, there are one first fastening element 81c and one second fastening element 82c, and they are disposed along a front side of the base 1c. In the present embodiment, there are two first fastening elements 81c and two second fastening elements 82c, and the two pairs of first fastening elements 81c and second fastening elements 82c are disposed to the base 1c's lateral sides, respectively. Only when locking from both sides is released altogether, the cover 2c then may be opened, preventing the accidental pressing of button element 83c to open the cover 2c.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A vacuum sealer, comprising:
   a base;
   a cover pivotally joined to the base;
   a vacuuming device on the base and the cover;
   at least a heating device inside the base to a side of the vacuuming device;
   at least a heat-resistant element wrapping around the heating device;
   at least a heat insulation element between the base and the heating device;
   a heat-resistant plastic sheet fixing the heating device to the at least a heat insulation element;
   at least a power provision device to a side of the base electrically connected to the heating device;
   at least a safety breaker device disrupting electricity provision of the power provision device, where the safety breaker device comprises at least a safety switch inside the base, and at least a trigger element on the cover; and
   a cutter device pivotally joined to the top side of the base;
   wherein electricity provision from the power provision device is conducted only when the trigger element and the safety switch are engaged;
   the vacuuming device comprises a vacuuming pump inside the base, at least a suction pipe inside the base connected with the vacuuming pump, a first sealing ring on the base surrounding the suction pipe, and a second sealing ring on the cover corresponding to the first sealing ring;
   after the cover is closed, the first sealing ring of the base and the second sealing ring of the cover are attached together to form a suction space, and the suction pipe is located within the suction space;
   the cutter device comprises a sliding duct on the base, at least a cutting pad inside the sliding duct, at least a cutter slidably disposed in the sliding duct through the cutting pad, and a handle on the cutter;
   the cutter comprises a blade having a 45-degree included angle relative to the cutting pad;
   the heating device comprises a plurality of heat conduction elements, at least a heating wire winding around the heat conduction elements; and
   the heat conduction elements are carbon fibers.

2. The vacuum sealer according to claim 1, wherein the heat-resistant element is one of a nylon sleeve, a carbon fiber sleeve, and a polytetrafluoroethylene sleeve.

3. The vacuum sealer according to claim 1, wherein the safety breaker device further comprises a processing module activated when the trigger element and the safety switch are engaged, and a relay to a side of the processing module electrically connected to the power provision device.

4. The vacuum sealer according to claim 1, further comprising
- at least a first fastening element disposed to a side of the base;
- at least a second fastening element on a bottom side of the cover corresponding to the first fastening element; and
- a pressure-releasing element cooperatively operating with the first fastening element.

5. The vacuum sealer according to claim 4, further comprising
- at least a button element to a side of the base connecting the first fastening element for disengaging the first fastening element and the second fastening element; and
- an elastic element on the first fastening element away from the button element.

6. The vacuum sealer according to claim 1, wherein the power provision device provides an electricity of 220 to 240 Volt.

\* \* \* \* \*